United States Patent
Ghose et al.

(10) Patent No.: US 12,298,420 B2
(45) Date of Patent: May 13, 2025

(54) METHOD AND SYSTEM OF ERROR MODELLING FOR OBJECT LOCALIZATION USING ULTRA WIDE BAND (UWB) SENSORS

(71) Applicant: Tata Consultancy Services Limited, Mumbai (IN)

(72) Inventors: Avik Ghose, Kolkata (IN); Chirabrata Bhaumik, Kolkata (IN); Tapas Chakravarty, Kolkata (IN); Amit Swain, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 356 days.

(21) Appl. No.: 17/956,006

(22) Filed: Sep. 29, 2022

(65) Prior Publication Data

US 2023/0115981 A1    Apr. 13, 2023

(30) Foreign Application Priority Data

Oct. 12, 2021   (IN) .............................. 202121046581

(51) Int. Cl.
  *G01S 5/02*    (2010.01)
  *H04W 64/00*   (2009.01)

(52) U.S. Cl.
  CPC ......... *G01S 5/0284* (2013.01); *H04W 64/003* (2013.01)

(58) Field of Classification Search
  None
  See application file for complete search history.

(56) References Cited

U.S. PATENT DOCUMENTS

| 9,602,972 | B2 | 3/2017 | Maranò et al. |
| 2013/0271324 | A1* | 10/2013 | Sendonaris ........... G01S 5/0236 342/450 |
| 2017/0212211 | A1* | 7/2017 | Gates .................... G01S 5/0218 |
| 2021/0255634 | A1* | 8/2021 | Mancilla Montiel ........................ H04W 4/023 |

OTHER PUBLICATIONS

Xin et al., "A Bayesian Filtering Approach for Error Mitigation in Ultra-Wideband Ranging," Sensors, 19(440) (2019).
Zhu et al., "Bias compensation for UWB ranging for pedestrian geolocation applications," IEEE Sensors Letters, 3(9) (2019).

* cited by examiner

*Primary Examiner* — Adolf Dsouza
(74) *Attorney, Agent, or Firm* — Finnegan, Henderson, Farabow, Garrett & Dunner, LLP

(57) ABSTRACT

Ultra Wide Band (UWB) based Real Time Location Systems (RTLS) that are being used for location tracking suffer from environment specific errors that are introduced due to factors such as difference in reflection and propagation. In order to address this challenge, present invention discloses performing error modelling for object localization using Ultra Wide Band (UWB) sensors. The error modelling allows to correct a determined location of an object being tracked, to determine a corrected location. Based on an obtained distance value of a tag node with reference to position of a plurality of anchor nodes, location of an object in a 2-Dimensional space is determined. The determined location is corrected to obtain the corrected location, and in this process the error modelling and related error correction is done.

6 Claims, 3 Drawing Sheets

METHOD AND SYSTEM OF ERROR MODELLING FOR OBJECT LOCALIZATION USING ULTRA WIDE BAND (UWB) SENSORS

PRIORITY CLAIM

This U.S. patent application claims priority under 35 U.S.C. § 119 to: Indian Patent Application No. 202121046581, filed on Oct. 12, 2021. The entire contents of the aforementioned application are incorporated herein by reference.

TECHNICAL FIELD

The disclosure herein generally relates to object localization, and, more particularly, to a method and system of error modelling for object localization using Ultra Wide Band (UWB) sensors.

BACKGROUND

Real Time Location Systems (RTLS), which are used for real-time location tracking of objects, perform Indoor localization of objects by tracking and determining location/position of the objects inside a building. The RTLS technique finds application in many fields. An example is tracking of individuals inside homes and other living spaces for providing assisted living services. Ultra Wide Band (UWB) based localization is a well known approach and is widely used by the RTLS systems for the indoor localization purpose.

However, a disadvantage of the state of the art UWB based localization approaches is that environment specific errors are introduced due to factors such as difference in reflection and propagation. This error in turn affects accuracy with which the normalization is being performed, and as a result a determined location of an object being tracked may be inaccurate.

SUMMARY

Embodiments of the present disclosure present technological improvements as solutions to one or more of the above-mentioned technical problems recognized by the inventors in conventional systems. For example, in one embodiment, a processor implemented method for location tracking is provided. In this method, initially a distance value of a tag node with reference to position of a plurality of anchor nodes are obtained by an edge node implemented via one or more hardware processors, wherein the tag node is associated with an object being tracked. Based on the obtained distance value of the tag node with reference to the position of the plurality of anchor nodes, the edge node determines location (X, Y) of the object in a 2-Dimensional (2D) space. Further, the determined location (X, Y) of the object is corrected to obtain a corrected location (X', Y'), by the edge node. Correcting the determined location involves calculating a moving average for the determined location (X, Y) over a one second time span, and applying a multivariate model over the calculated moving average and a corresponding ground truth location. Applying the multivariate model includes the following steps. Initially, an error function is computed by calculating a Euclidian distance between the determined location and the ground truth location. Further, an argument of the minimum for the error function is determined by applying an argmin function over the computed error function. Further, values of bias, scale factor, and interaxial factor are applied on the calculated moving average, wherein the values of the bias, scale factor, and interaxial factor are computed based on the determined argument of the minimum of the error function.

In another aspect, a system for location tracking is provided. The system includes one or more hardware processors, a communication interface, and a memory storing a plurality of instructions. The plurality instructions when executed, cause the one or more hardware processors to initially obtain distance value of a tag node with reference to position of a plurality of anchor nodes, by an edge node implemented via the one or more hardware processors, wherein the tag node is associated with an object being tracked. Based on the obtained distance value of the tag node with reference to the position of the plurality of anchor nodes, the edge node determines location (X, Y) of the object in a 2-Dimensional (2D) space. Further, the determined location (X, Y) of the object is corrected to obtain a corrected location (X', Y'), by the edge node. Correcting the determined location involves calculating a moving average for the determined location (X, Y) over a one second time span, and applying a multivariate model over the calculated moving average and a corresponding ground truth location. Applying the multivariate model includes the following steps. Initially, an error function is computed by calculating a Euclidian distance between the determined location and the around truth location. Further, an argument of the minimum for the error function is determined by applying an argmin function over the computed error function. Further, values of bias, scale factor, and interaxial factor are applied on the calculated moving average, wherein the values of the bias, scale factor, and interaxial factor are computed based on the determined argument of the minimum of the error function.

In yet another aspect, a non-transitory computer readable medium for location tracking is provided. The non-transitory computer readable medium comprises a plurality of instructions, which when executed cause the one or more hardware processors to perform the location tracking by executing the following steps. Initially a distance value of a tag node with reference to position of a plurality of anchor nodes are obtained by an edge node implemented via one or more hardware processors, wherein the tag node is associated with an object being tracked. Based on the obtained distance value of the tag node with reference to the position of the plurality of anchor nodes, the edge node determines location (X, Y) of the object in a 2-Dimensional (2D) space. Further, the determined location (X, Y) of the object is corrected to obtain a corrected location (X', Y'), by the edge node. Correcting the determined location involves calculating a moving average for the determined location (X, Y) over a one second time span, and applying a multivariate model over the calculated moving average and a corresponding ground truth location. Applying the multivariate model includes the following steps. Initially, an error function is computed by calculating a Euclidian distance between the determined location and the ground truth location. Further, an argument of the minimum for the error function is determined by applying an argmin function over the computed error function. Further, values of bias, scale factor, and interaxial factor are applied on the calculated moving average, wherein the values of the bias, scale factor, and interaxial factor are computed based on the determined argument of the minimum of the error function.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Figure 1:
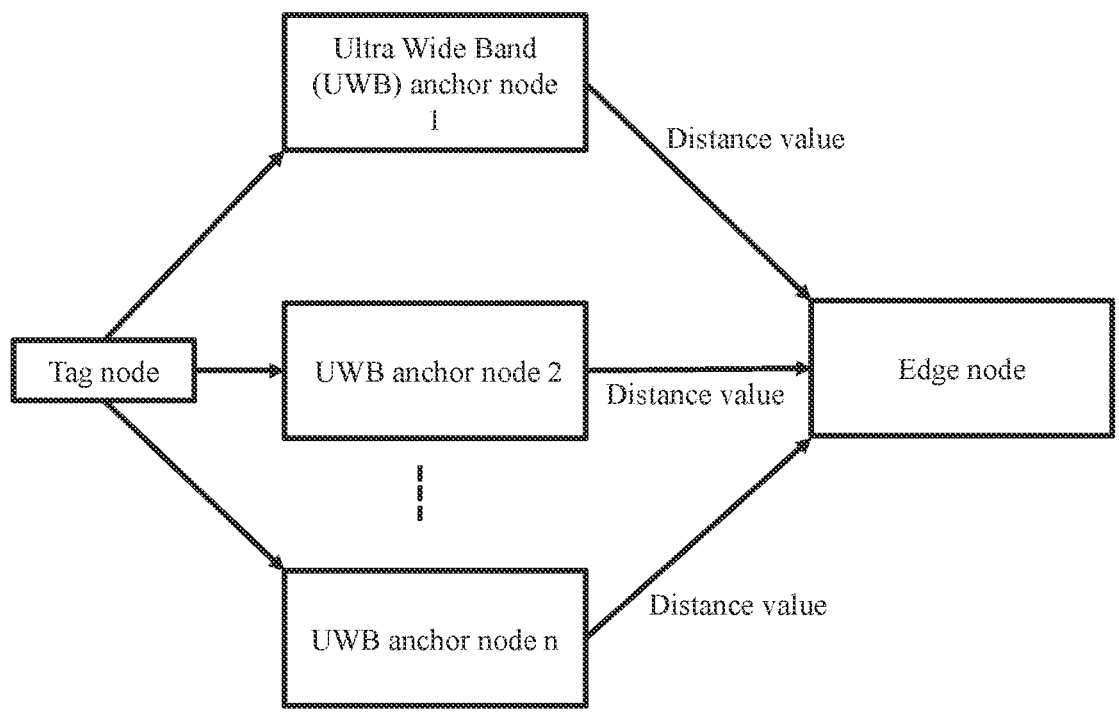
FIG. 1 illustrates an exemplary architecture of a location tracking framework for tracking location of an object, according to some embodiments of the present disclosure.
Figure 2:
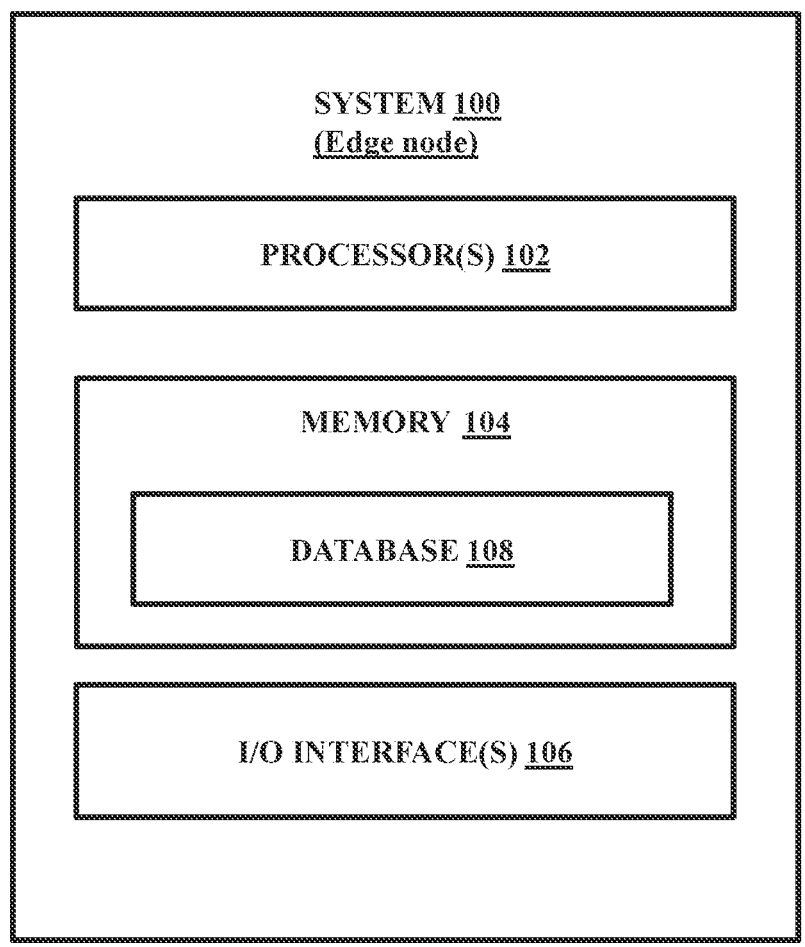
FIG. 2 is a functional block diagram of a system (an edge node) of the location tracking framework of FIG. 1, according to some embodiments of the present disclosure.
Figure 3:
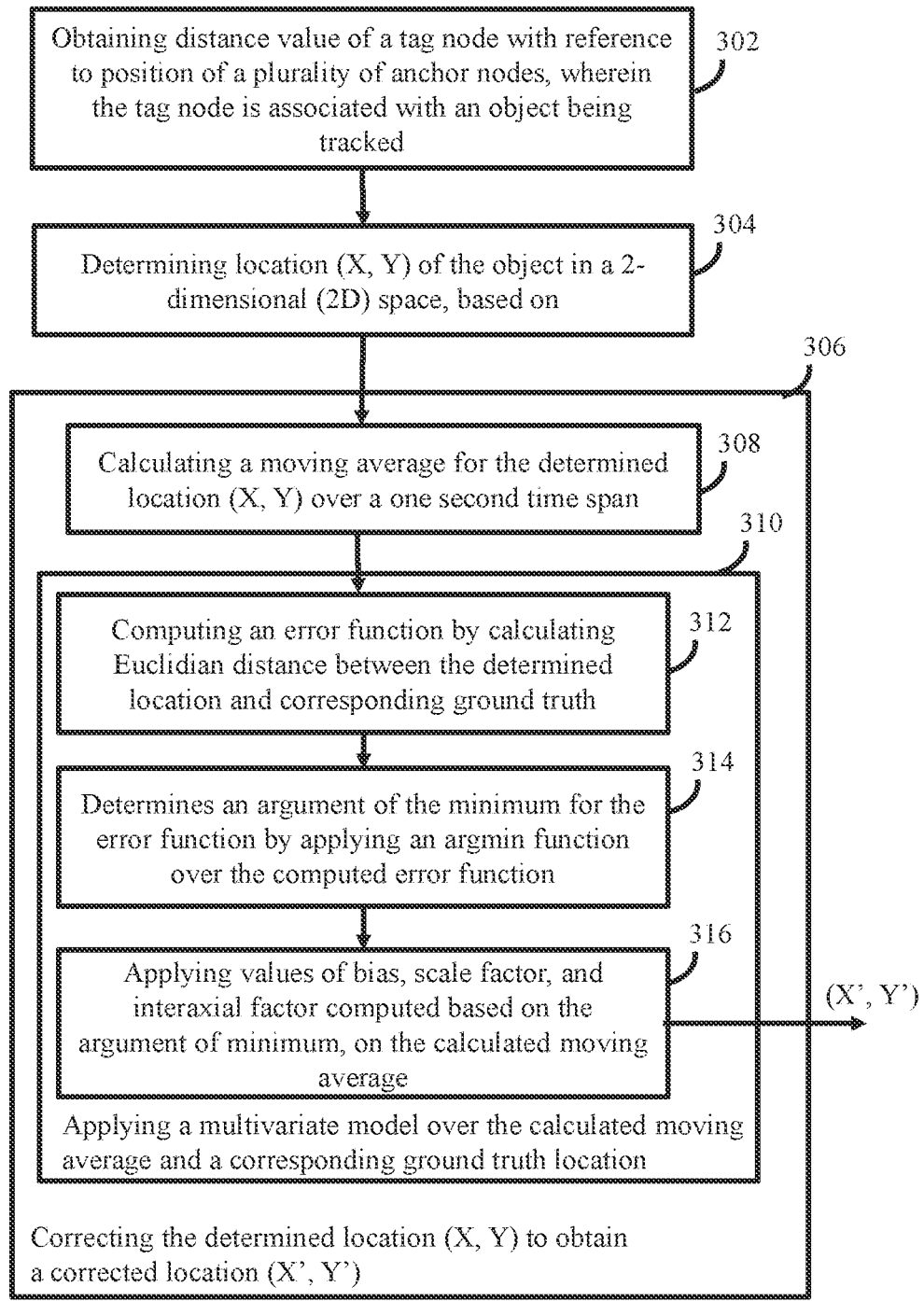
FIG. 3 is a flow diagram depicting steps involved in the process of tracking location of an object, using the location tracking framework of FIG. 1, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary architecture of a location tracking framework for tracking location of an object, according to some embodiments of the present disclosure. The location tracking framework when used for tracking location of an object, contains a tag node, a plurality of Ultra Wide Band (UWB) anchor nodes, and an edge node. The tag node is associated with an object being tracked. In an embodiment, the location tracking framework disclosed herein can be used for tracking location of physical objects as well as of people. So, in context of the embodiments disclosed herein, the term "object" may refer to a person and/or any other physical object.

During the location tracking, distance of the tag node from each of the plurality of anchor nodes is determined by each of the anchor nodes. The determined distance information is then transmitted to the edge node by the anchor nodes. In an embodiment, the edge node is a local node that is in communication with the plurality of anchor nodes. In another embodiment, the edge node may be deployed on cloud, and may communicate with the anchor nodes directly via appropriate channels or through one or more intermediate nodes (not shown). The edge node is configured to determine location (X, Y), and then determine a corrected location (X', Y'), of the object.

An example architecture of the edge node for performing the location tracking is depicted in FIG. 2. The edge node is also termed as system 100, and the terms 'edge node' and 'system 100' are used interchangeably. In an embodiment, the system 100 includes a processor(s) 102, communication interface device(s), alternatively referred as input/output (I/O) interface(s) 106, and one or more data storage devices or a memory 104 operatively coupled to the processor(s) 102. The system 100 with one or more hardware processors is configured to execute functions of one or more functional blocks of the system 100.

Referring to the components of system 100, in an embodiment, the processor(s) 102, can be one or more hardware processors 102. In an embodiment, the one or more hardware processors 102 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 102 are configured to fetch and execute computer-readable instructions stored in the memory 104. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the Ike and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 104 includes a database 108 that stores all data associated with the process of location tracking of the object, being performed by the system 100. For example, the database 108 stores the configurable instructions that are executed to cause the one or more hardware processors 102 to perform various steps associated with the location tracking of the object. The database 108 may further store all data, i.e. information on measured distance of the tag node from the UWB anchor nodes, the determined location (X, Y) of the object, a measured error, a corresponding corrected location (X'. Y') and so on.

Various steps involved in the process of tracking the location of the object are depicted in the flow diagram in FIG. 3. Functions of the components of the location tracking framework of FIG. 1 and the system (edge node) 100 of FIG. 2 are explained with reference to the flow diagram in FIG. 3.

Based on the distance values of the tag node obtained from each of the plurality of anchor nodes at step 302, further at step 304, the edge node determines location (X, Y) of the object. In an embodiment, the edge node may use any suitable trilateration technique to determine/calculate the location (X, Y) of the object. An example of the trilateration technique that may be used by the system 100 at step 304 is iterative least square trilateration. At step 306, the system 100 corrects the determined location (X, Y) to obtain a corrected location (X', Y').

Correcting the determined location (X, Y) includes two sub-steps 308 and 310. At step 308, the system 100 calculates a moving average of the determined location (X, Y) over a pre-defined time span. In an embodiment, the time span is determined and defined based on one or more characteristics of the object being monitored for location tracking. For example, if the object being tracked is a human, then the characteristics may be human mobility parameters such as but not limited to age, sex, and demography, which may have direct impact on the mobility of the human. The system 100 calculates the moving average over a plurality of values of the location (X, Y), wherein the plurality of values of the location (X, Y) are determined using the distance values of the tag node from the plurality of UWB anchor nodes, obtained over a specific period of time. Here, value of the 'specific period of time' may be pre-configured or dynamically configured with the system 100. By calculating the moving average, the system 100 reduces measurement noise on the determined location (X, Y). Further, at step 310, the system 100 applies a multi-variate model over the calculated moving average and a corresponding ground truth location.

In an embodiment, the multi-variate model is generated by training a data model using a number of readings taken for a new environment and corresponding around truth measurements of location taken by physical measurement as training data. By virtue of the training, values of bias, scale factor, and interaxial factor parameters are calculated as:

$$x\text{Scale}*\text{measured}X+x\text{Bias}+\\ \text{interaxialFactor}*\text{measured}X/\\ \text{measured}Y=\text{corrected}X \quad (1)$$

$$y\text{Scale}*\text{measured}Y+y\text{Bias}+\text{interaxialFactor measured}X/\text{measured}Y=\text{corrected}Y$$

$$=>Ax=[x\text{Scale}_i], Dx=[x\text{Bias}\\ \text{interaxialFactor}*\text{measured}X/\text{measured}Y]Vx=\\ [\text{measured}X][\text{corrected}X]$$

$$Ay=[y\text{Scale}_i]Dy=[y\text{Bias interaxialFactor}*\text{measured}X/\\ \text{measured}Y]Vy=[\text{measured}Y][\text{corrected}Y]$$

$$L2\text{Norm}=((\text{corrected}X-\text{actual}X)^2+(\text{corrected}Y-\text{actual}Y)^2)=$$

$$=>\text{ObjectiveFunction}=\text{argmin}((\text{corrected}X-\text{actual}X)^2+\\ (\text{corrected}Y-\text{actual}Y)^2)$$

$$=>\text{argmin}((\text{corrected}X-\text{actual}X)^2+(\text{corrected}Y-\text{actual}Y)^2) \quad (2)$$

Combining (1) and (2):

$$=>\text{argmin}((x\text{Scale}*\text{measured}X+x\text{Bias}+\\ \text{interaxialFactor}*\text{measured}X/\text{measured}Y-\text{actual}X)^2\\ (y\text{Scale}*\text{measured}Y+y\text{Bias}+\\ \text{interaxialFactor}*\text{measured}X/\text{measured}Y-\text{actual}Y)^2) \quad (3)$$

where:
measuredX=measured value of X in determined (X, Y) location
actualX=ground truth X value
measuredY=measured value of Y in determined (X, Y) location
actualY=ground truth Y value
Values of xScale, yScale, xBias, yBias and interaxialFactor empirically determined.

In an embodiment, the multivariate model is generated by using training data specific to a particular location in which the position of an object is to be determined. After determining the values of the bias, scale factor, and interaxial factor for a location, these values are applied on the location data in a real-time location tracking scenario. When the location tracking of the object is to be done in another location, the multivariate model can be accordingly generated by determining values of the bias, scale factor, and interaxial factor parameters for the location, and this multivariate model is then applied on location data of the object obtained from that particular location.

When the multi-variate model is applied on the (X, Y) values, initially at step 312 the system 100 computes an error function. The error function represents extent of difference between the determined location (X, Y) and corresponding ground truth. In an embodiment, the system 100 computes the error function based on a Euclidean distance between the determined location and the corresponding ground truth. The Euclidean distance is calculated as:

$$\text{EuclidianDistance}=((\text{corrected}X-\text{actual}X)^2+(\text{corrected}Y-\text{actual}Y)^2)^{1/2} \quad (4)$$

From (4), the system 100 obtains value of Root Mean Square (RMS) error as:

$$\text{Root mean squared error}=(\text{corrected}X-\text{actual}X)^2+\\ (\text{corrected}Y-\text{actual}Y)^2)=>\text{RMS ERROR}=\{(\text{corrected}X-\text{actual}X)^2+(\text{corrected}Y-\text{actual}Y)^2\} \quad (5)$$

Further at step 314, the system 100 determines an argument of minimum for the error function by applying an argmin function over the error function computed at step 312. This step involves modeling the error function in the form:

ArgMin (Euclidean ((Xmeasured, Ymeasured), (Xreference, Yreference)))

Further, at step 316, the system 100 applies the values of bias, scale factor, and interaxial factor, determined by training the multivariate model, on the calculated moving average, thus determining the corrected location (X', Y').

In an embodiment, the steps in method 300 may be performed in the same order as depicted in FIG. 3 or in any alternate order as technically feasible. In another embodiment, one or more steps in the method 300 may be omitted.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure herein addresses unresolved problem of error correction in UWB based indoor localization. The embodiment, thus provides a method and system for correcting a determined location of an object, based on a determined error. Moreover, the embodiments herein further provide a mechanism of applying multivariate model for the error correction.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g.; any kind of computer like a server or a personal computer, or the Ike, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for location tracking, comprising:

obtaining distance value of a tag node with reference to position of a plurality of anchor nodes, by an edge node implemented via one or more hardware processors, wherein the tag node is associated with an object being tracked;

determining location (X, Y) of the object in a 2-Dimensional space, based on the obtained distance value of the tag node with reference to the position of the plurality of anchor nodes, by the edge node; and correcting the determined location (X, Y) of the object to obtain a corrected location (X', Y'), by the edge node, comprising:

calculating a moving average for the determined location (X, Y) over a one second time span; and applying a multivariate model over the calculated moving average and a corresponding ground truth location, wherein applying a multivariate model comprises:

computing an error function by calculating a Euclidian distance between the determined location and the ground truth location;

determining an argument of the minimum for the error function by applying an argmin function over the computed error function; and applying values of a bias, a scale factor, and an interaxial factor on the calculated moving average, wherein the values of the bias, the scale factor, and the interaxial factor are computed based on the determined argument of the minimum of the error function.

2. The method of claim 1, wherein the multivariate model comprises computed values of the bias, the scale factor, and the interaxial factor for a plurality of pairs of determined location and corresponding ground truth location on a training data set.

3. A system for location tracking, comprising:
one or more hardware processors;
a communication interface; and
a memory storing a plurality of instructions, wherein the plurality instructions when executed, cause the one or more hardware processors to:

obtain distance value of a tag node with reference to position of a plurality of anchor nodes, by an edge node implemented via the one or more hardware processors, wherein the tag node is associated with an object being tracked;

determine location (X, Y) of the object in a 2-Dimensional space, based on the obtained distance value of the tag node with reference to the position of the plurality of anchor nodes, by the edge node; and correct the determined location (X, Y) of the object to obtain a corrected location (X', Y'), by the edge node, by:

calculating a moving average for the determined location (X, Y) over a one second time span; and applying a multivariate model over the calculated moving average and a corresponding ground truth location, wherein applying a multivariate model comprises:

computing an error function by calculating a Euclidian distance between the determined location and the ground truth location;

determining an argument of the minimum for the error function by applying an argmin function over the computed error function; and applying values of a bias, a scale factor, and an interaxial factor on the calculated moving average, wherein the values of the bias, the scale factor, and the interaxial factor are computed based on the determined argument of the minimum of the error function.

4. The system as claimed in claim 3, wherein the multivariate model comprises computed values of the bias, the scale factor, and the interaxial factor for a plurality of pairs of determined location and corresponding ground truth location on a training data set.

5. One or more non-transitory machine-readable information storage mediums comprising one or more instructions which when executed by one or more hardware processors cause:
  obtaining distance value of a tag node with reference to position of a plurality of anchor nodes, by an edge node implemented wherein the tag node is associated with an object being tracked;
  determining location (X, Y) of the object in a 2-Dimensional space, based on the obtained distance value of the tag node with reference to the position of the plurality of anchor nodes, by the edge node; and
  correcting the determined location (X, Y) of the object to obtain a corrected location (X', Y'), by the edge node, comprising:
    calculating a moving average for the determined location (X, Y) over a one second time span; and
    applying a multivariate model over the calculated moving average and a corresponding ground truth location, wherein applying a multivariate model comprises:
      computing an error function by calculating a Euclidian distance between the determined location and the ground truth location;
      determining an argument of the minimum for the error function by applying an argmin function over the computed error function; and
      applying values of a bias, a scale factor, and an interaxial factor on the calculated moving average, wherein the values of the bias, the scale factor, and the interaxial factor are computed based on the determined argument of the minimum of the error function.

6. The one or more non-transitory machine-readable information storage mediums of claim 5, wherein the multivariate model comprises computed values of the bias, the scale factor, and the interaxial factor for a plurality of pairs of determined location and corresponding ground truth location on a training data set.

* * * * *